(12) United States Patent
Alves de Moura et al.

(10) Patent No.: US 7,721,303 B2
(45) Date of Patent: May 18, 2010

(54) SYSTEM FOR MANAGEMENT OF INTERACTIONS BETWEEN USERS AND SOFTWARE APPLICATIONS IN A WEB ENVIRONMENT

(75) Inventors: Francisca Rodrigues Alves de Moura, Rio de Janeiro (BR); Tiago de Melo Peixoto, Rio de Janeiro (BR); José Walter de Moura Junior, Rio de Janeiro (BR)

(73) Assignee: Embria Informatica Ltda., Rio de Janeiro (BR)

( * ) Notice: Subject to any disclaimer, the term of this patent is extended or adjusted under 35 U.S.C. 154(b) by 1225 days.

(21) Appl. No.: 10/535,886

(22) PCT Filed: Jan. 31, 2005

(86) PCT No.: PCT/BR2005/000013

§ 371 (c)(1),
(2), (4) Date: May 23, 2005

(87) PCT Pub. No.: WO2005/101946

PCT Pub. Date: Nov. 3, 2005

(65) Prior Publication Data

US 2006/0080592 A1 Apr. 13, 2006

(30) Foreign Application Priority Data

Apr. 20, 2004 (BR) .................................. 0401465

(51) Int. Cl.
G06F 3/00 (2006.01)
G06F 15/16 (2006.01)

(52) U.S. Cl. ...................... 719/328; 709/202

(58) Field of Classification Search ................ 719/310, 719/328; 715/200; 709/202
See application file for complete search history.

(56) References Cited

U.S. PATENT DOCUMENTS

| 5,835,724 | A | * | 11/1998 | Smith | ......................... 709/227 |
| 6,360,250 | B1 | | 3/2002 | Anupam et al. | |
| 6,604,209 | B1 | * | 8/2003 | Grucci et al. | ................. 714/38 |
| 6,941,562 | B2 | * | 9/2005 | Gao et al. | .................... 719/330 |
| 7,263,526 | B1 | * | 8/2007 | Busey et al. | ................ 707/102 |

(Continued)

FOREIGN PATENT DOCUMENTS

DE 100 28 842 A1 1/2002

OTHER PUBLICATIONS

International Search Report from International Patent Application No. PCT/BR2005/000013, filed Jan. 31, 2005.

*Primary Examiner*—Lechi Truong
(74) *Attorney, Agent, or Firm*—Alston & Bird LLP

(57) ABSTRACT

There is disclosed a system for management of interactions between users and software applications in a web environment, related to an operating environment which functional devices are in charge of providing methods allowing maximum interactivity between the end user and the application. The operating environment also includes a set of applications available to end users, administrators and developers. The applications for end users are intended to provide interactivity, storage, data organization, publication and search. For the administrators, the applications allow full configuration of the behavior of the system and of the agents included within its scope. And for the developers, the system provides configuration kits that enable interfacing between the objects included in its operating context.

33 Claims, 9 Drawing Sheets

U.S. PATENT DOCUMENTS 7,433,918 B2 * 10/2008 Rivers et al. ................ 709/203
7,502,995 B2 *  3/2009 Takagi et al. ................ 715/234
2002/0129106 A1  9/2002 Gutfreund
2003/0063119 A1  4/2003 Bloomfield et al.

* cited by examiner

SYSTEM FOR MANAGEMENT OF INTERACTIONS BETWEEN USERS AND SOFTWARE APPLICATIONS IN A WEB ENVIRONMENT

BACKGROUND OF THE INVENTION

1. Field of the Invention

The present invention relates to methods and systems applying to a software operating environment that is fully operated by a browser program, that includes a set of tools intended to provide interactivity, storage, data management, publication and search, and that provides resources enabling every application within its context to have the following functionalities:

the ability to provide an interface with multiple windows and processes in visual simultaneity;

the ability for dynamically updating the content of its pages or of only a part thereof in a synchronized manner, whereby all users that are online will be able to view the change at the same time;

the ability to monitor any user actions performed within the scope of use thereof; the ability to generate interventions in real time, that is, the ability for remote generation of commands to be run by one or more users while such user or users is/are using the application;

the ability to have multiple designs of HTML screens without the need to change the program source code thereof; the ability to provide, based on an established data model, the screens used for recording information, as well as reports, graphs and searches, automatically generated, including having their respective designs altered while running according to clearance of access of the users to the fields, data filters and operations; and the ability to use and to create software components having all the functionalities cited above and allowing customization by changes in the values of their properties.

2. Description of Related Art

The currently developed software applications have as a characteristic the fact that they are installed in the machine where they will be used or accessed by a preexisting browser utility, based on a Web address provided in the form of a URL. In this last case, a part of the application is run by the browser itself and another part is run by a server receiving requests in HTTP protocol.

The applications thus installed have their appearances and behaviors controlled by the operating system running in the target machine. As a rule, such operating systems, in addition to having a whole set of interfaces to establish connections between the applications and the hardware devices, have some preinstalled programs intended for device management, communications, storage, etc.

The advantage provided by this type of application is that, due to being able to benefit from all the resources made available by the resident operating system, they provide a rich and pleasant interactivity experience to their users. The most remarkable disadvantage consists in the fact that the user is only able to access the application resources if the application is installed in the target machine, and at every update to a new version aimed to provide new functionalities, debugging and design updating, the user is required to run updates in the form of patches generated by the author of the application. Furthermore, the tools preinstalled with the operating system, as required for file/folder management, communications, etc., have different interfaces depending on the operating system used, while however having quite similar functionalities. This disadvantage causes the user to remain "stuck" to a specific machine in order to be able to avail himself or herself of the desired computing resources, since the effort incurred with installation, configuration and self-training at every change of equipment/operating system is excessively burdening.

On the other hand, the web-type applications (those accessed by a browser) allow the user to remain independent in relation to type of equipment, operating system and version updates, since all interactivity-related content is dynamically generated by the server and interpreted by the browser utility resident in the target machine, and since as a rule the browser utilities follow the rules regarding syntax and functionalities as provided by the W3C organization (World Wide Web Consortium) irrespective of the operating systems for which the same were developed. The other relevant advantage is that a user from any location is able to access resources available in various HTTP servers and provided by various suppliers without requiring rigid network configurations, links, etc.

The main disadvantage of this type of application is that the interactivity experience provided thereby cannot even start to be compared with that provided by the installable application type. In order to illustrate this point, there will be cited herein, from multiple others, the following examples that are directly related to the scope of the present invention:

there is no presence of the concept of multiple windows, visually simultaneous, since every time that a window is selected (focused), the former window is automatically minimized;

there is not a visual feeling of "fixed data" and "variable data", since every time that the application needs to resort to the server, the entire screen blinks, whereby the static content seems to have changed; and the functional components such as menus, toolbars, grids, buttons, etc. have quite restricted functionalities when compared with those same components associated to installable type applications.

Certain solutions that partially circumvent this problem, such as: content managers, design time components (DTC), HTML components (HTC), etc., are already available in the market, however they have proven incipient in the face of the needs to be met, since the transactional model browser versus server remains unchanged. When the end user performs an action whereby the application needs to access the server, the following happens: either one other page is sent to the browser; or the same page is resent, notwithstanding that in the majority of cases a part of the content thereof remains unchanged, or there is displayed a pop-up window which is automatically minimized upon some action (a mouse click, for instance) being performed outside of its context.

In addition to the functional aspects of use of Web applications that have been pointed out in comparison to the installable applications, the following prior art solutions are listed below:

page content dynamically altered without user input (in the case of banners, gifs and flash animations) updating the display asynchronously, for example causing two different users to view the same effect in different moments;

the user inputs within the context of browsing through a web application are not recorded and fed to a database, but rather, what is collected at most, in all except some rare instances, is data such as regarding answers to polls, pages having been visited and quantities of clicks on banners;

the advertisement broadcasting process is carried out in a decentralized, redundant and non-instantaneous manner, requiring that every site used to advertise products be registered in several search engines in order to provide a minimum degree of visibility thereto;

there is no concept of generation of interventions in real time, such as, for example, sending a remote command for the browser of a certain user to invoke a certain window; and the Web application programming tools, save for rare exceptions, require that one same file be used for data relative to design and programming codes, which burdens the maintenance of the programs and does not allow that a page (or part thereof) may have multiple designs but only one programming source code.

BRIEF SUMMARY OF THE INVENTION

The present invention provides a software operating environment for systems and methods, which functional devices are run partly by a browser utility and partly within the context of a server program answering requests of protocols such as HTTP, SOAP, or any others defined by the World Wide Web Consortium. The set of devices is in charge of creating a processing layer, hereinafter also named the "virtual system", which purpose is to provide methods enabling enhanced interactivity between the end user and the application. This entails, as regards the application, the acquisition of the following functional capabilities exceeding those currently associated with a Web application:

the ability to have an interface with multiple windows and processes displayed simultaneously;

the ability to dynamically change the content of its pages, or of only a part thereof, in a synchronous manner enabling all users that are online at a given time to view the change at the same time;

the ability to monitor any user inputs performed within the scope of use thereof;

the ability to generate interventions in real time, that is, the ability to remotely create commands to be run by one or more users when the latter is/are using the application;

the ability to have multiple HTML screen designs without the need to alter its programming source code;

the ability to automatically generate, from an established data model, screens for recording information as well as reports, graphs and searches, including having their designs altered while running, according to access clearance privileges of users to fields, data filters and operations; and the ability to use and to create software components with all the above cited functional capabilities, which respective contents and functionalities may be associated to the scope of a web page and may be customized by manipulation of their properties, methods and events.

The virtual system also includes a set of applications available to end users, administrators and developers.

The applications for end users are intended to meet requirements of interactivity, storage, data management, publication and searches. They are the following:

the contact manager, used to record contacts in groups of interest and to trigger instant messaging services, invitations to chat rooms and email discussion lists, and sending of emails;

the chat room manager, used to manage chats and discussion lists, after the fact, in course or pending, with options for scheduling, search and traceback;

the email manager, used to send, receive and manage email messages, organizing the same in folders, managing address books, searching and traceback;

the file manager, used to store and manage files and folders in a virtual area and to manage favorite items;

the publication manager, used to publish and manage news, polls, opportunities, articles, blogs and advertising campaigns; and the search manager, used to generate reports and graphs with optional filters for selection, sorting, summing up, decision cubes, etc., in respect of the entire database not only of the virtual system itself, but also of any application set up to run within its context.

For the administrators, the virtual system includes applications allowing full configuration of its behavior and the agents input within its scope. Such applications are the following:

the users and organizations manager, used to configure the users of the virtual system, recording the entities to which they respectively belong, with options allowing to sort the same by field of interest, control of quotas, and control of operating clearances and authorizations to use fields of the database of the virtual system itself and of any application within the context thereof;

the information flow manager, used to schedule dynamic contents of pages and synchronous components and to set up and schedule interventions based upon filters and conditions required of the database;

and the resource manager, used to monitor and configure the use of the system's computing resources.

Finally, for the developers, the virtual system provides configuration kits to enable interfacing between the objects within the context of its operation. These are the following:

the pages and applications configuration kit, whereby are established in any page links between its design objects, their associated components and their programming in the server and in the browser, as well as authorizations, behavior, etc.;

the component configuration kit, used for the creation of reusable web components establishing properties, methods, events and design styles;

the metadata configuration kit, used to set up the database schemes of the applications with the inclusion of additional properties rendering the same available for generic use by the search manager and for configuration of user authorizations; and the process configuration kit, whereby is defined the behavior of the batch run processes of the application and are defined real-time intervention mechanisms, based on work flow.

BRIEF DESCRIPTION OF THE SEVERAL VIEWS OF THE DRAWING(S)

DETAILED DESCRIPTION OF THE INVENTION

Figure 1:
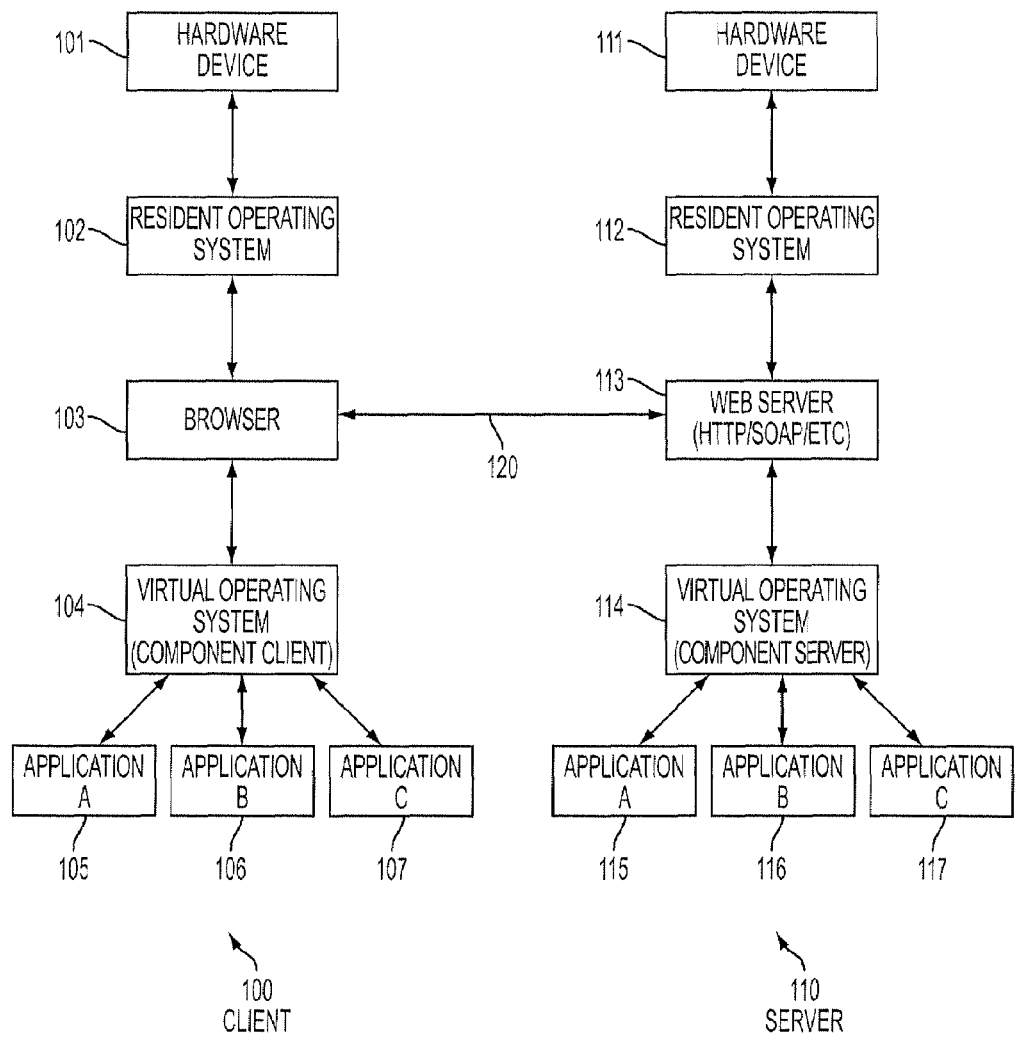
FIG. 1 is a block diagram depicting the basic processing layers occurring on the client end and on the server end according to the improvement proposed by the present invention.

FIG. 1 is a diagram representing the processing layers of a client machine 100 and a server machine 110 according to the preferred embodiment of the invention. The hardware devices 101 and 101 are at the lower processing level, followed by the operating systems resident in each machine, 102 and 112. The following layer is the layer where is established the initiative of communication between the machines, 120, whereby the user, by a browser utility 103, invokes the virtual system and is answered by a service 113 installed in the server machine 110, configured to respond to requests based on internet protocols (HTTP, SOAO, etc.). Within this context, the virtual system 114 is defined as a set of object-oriented classes compatible with the method of implementation required by the service 113 in order to be able to be invoked thereby.

From the moment when it is invoked, the virtual system 114 send to the browser 103, by the service 113, the page of its main browser along with a series of basic script subroutines 104. Such subroutines are in charge of the exchanges between the script codes of the applications 105, 106 and 107 and the mechanism used for interpretation of the scripts supported by the browser 103, and are required to provide independence regarding the various script language nuances used by the various browser utilities. Therefore, when loading the main browser, the virtual system 114 checks the type of browser utility employed by the user and associates thereto the subroutines for rendering, object positioning, media manipulation, opening of windows, etc., that will be invoked by the subsequent applications 105, 106 and 107, and that are compatible with the script interpretation mechanism of the browser program 103. The main browser of the virtual system 104 will thereupon be resident in the client machine 100 and will constitute the manner whereby the user will access the other applications. The applications may thence be defined as object-oriented classes 115, 116 and 117 having inherited methods and properties from the basic classes of the virtual system 114 and having as part of their source programming, script codes 105, 106 and 107 that invoke standardized subroutines 104 and are interpreted by the browser program 103. The main classes of the virtual system wherefrom the applications inherit methods and properties are:

the page class that is responsible for all the treatment of web pages perfected by the present invention, with respective design content, programming in the server and in the browser, in order to provide the interaction between the user and the application; the component class comprising fragments of HTML and XML code that are associated to the pages, having functionalities that are defined and reusable by manipulation of properties, methods and events, and also implemented by programming in both the server and the browser;

the metadata class used to send and receive required information in XML format within the transactional environment between the user and the virtual system; and the process class, for processes that represent the batch processing programs of the applications and are run in independent threads.

Figure 2:
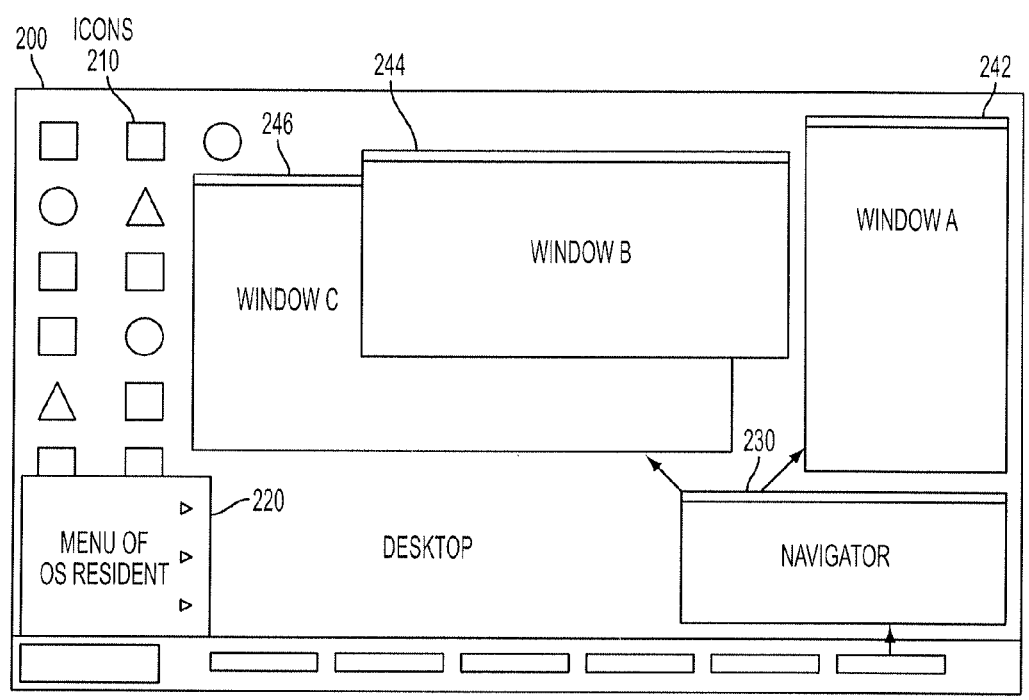
FIG. 2 shows an exemplary display interface for end users wherein is illustrated the functionality of multiple windows and processes occurring simultaneously, as incorporated by the present invention, within the context of a resident operating system.

FIG. 2 is a display scheme illustrating the operation of the present invention displayed on the screen of a client machine. This scheme represents the desktop area of a resident operating system 200, with its respective shortcut icons 210 and its main menu 220. From the moment when the user, using any manner provided by the resident operating system, starts up the browser utility and invokes the virtual system, its main browser is displayed on the video screen in a window format 230. This main browser includes a user authentication form and a menu intended for triggering the applications that do not require user authentication. Upon filling the form and upon the same being duly authenticated, the content of the browser is updated to display the basic information regarding the user in question and adds to the menu options for invoking pages of applications requiring authentication and in connection with which the user is required to hold an authorization to access. Each application is then preconfigured by the pages and applications configuration kit that the virtual system places at the disposal of developers and wherein is indicated, among other things, whether authentication is required or not, and the browsing menu that is intended to be associated to the menu of the main browser of the virtual system. The authorizations for use are configured by the virtual system administrators by the user manager, which automatically detects the configurations of the applications of the developers.

Thereupon, using the virtual system's main browser menu, the user may invoke the desired applications 242, 244 and 246, which will be displayed in the form of windows. Each window represents a page that may be triggered from the main browser or from any other window and which may be run exclusively (modal) or simultaneously depending on the desired configuration. The simultaneous running windows, upon being deselected, remain displayed, however superimposed by the main window, and thus creating a clear visual feeling of simultaneity.

Figure 3:
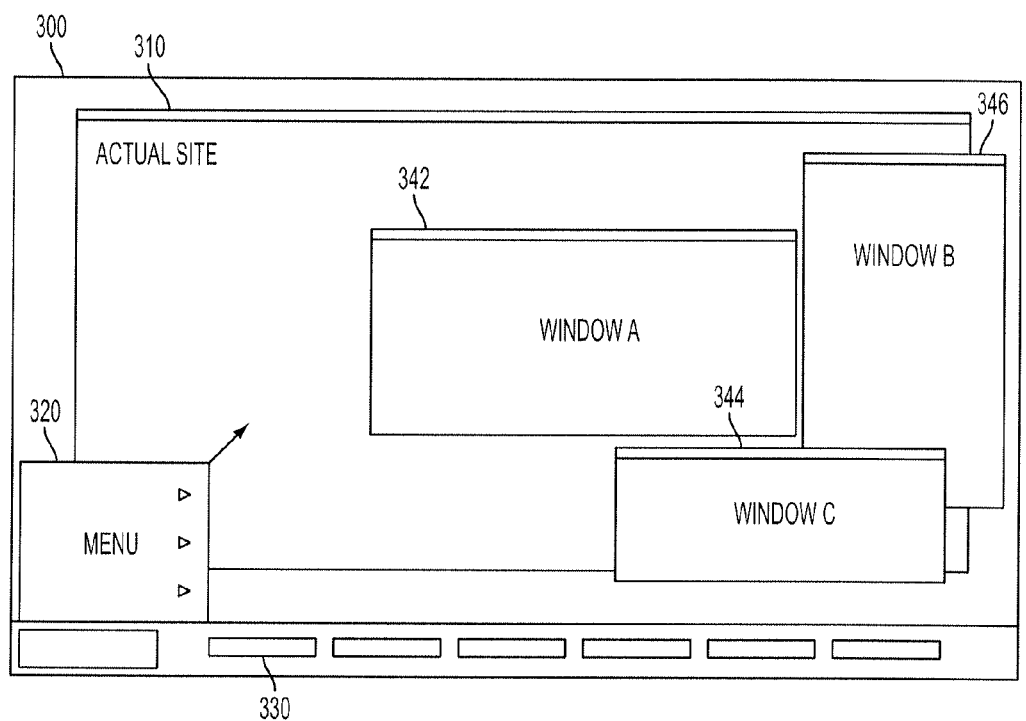
FIG. 3 shows another example of display interface for end users, wherein is illustrated the functionality of multiple windows and processes occurring simultaneously, as embodied in the present invention, within the context of one or more websites.

Another scheme for display of the operation of the present invention is shown in FIG. 3. In this model, the main browser of the virtual system is displayed onscreen as a desktop area 300. In this desktop area 300 there is located a cascade-style menu 320 that is used to activate applications, both in the form of visually simultaneous windows 342, 344 and 346, and in the form of background areas 310. In order that several applications displayed in the form of background 310 may be manipulated at the same time, there is a tab area 330 whereby the user may alternate the respective displays. Using the menu, the user may also invoke other websites outside of the scope of the virtual system. In that case, such sites will always be displayed in the form of background areas 310.

The two modalities of interface having been introduced illustrate a display scheme that is analogous to what we call an SDI environment and an MDI environment, widely used in the installable applications currently available in the market.

Figure 4:
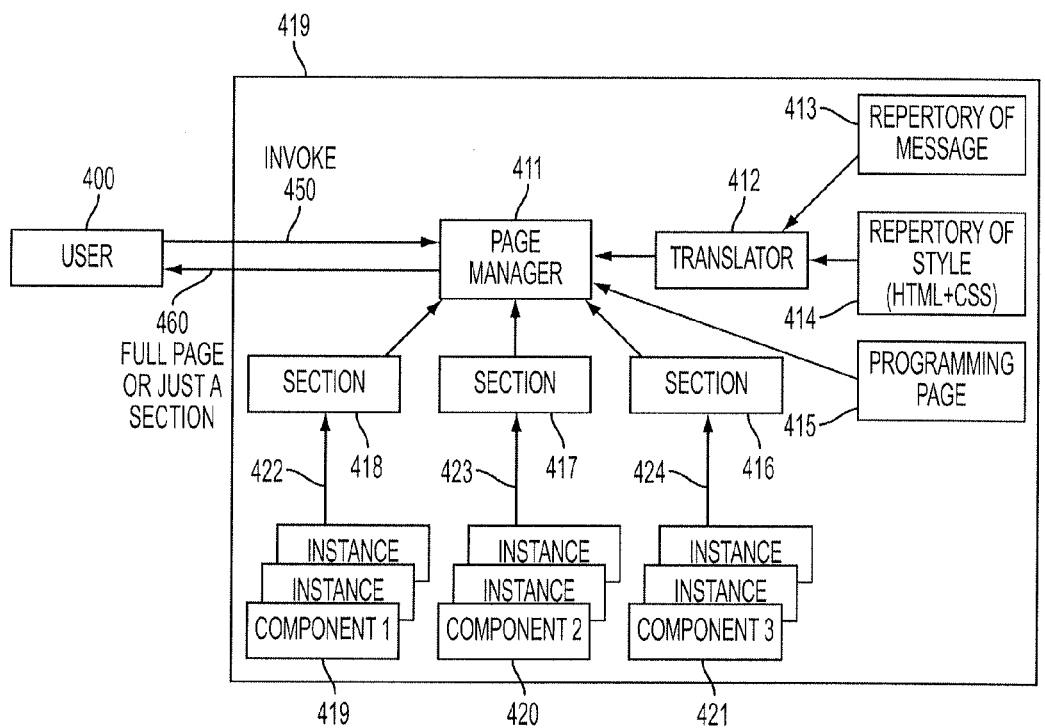
FIG. 4 is a block diagram illustrating the functional aspects of the interaction between users and web pages, according to the improvement proposed by the present invention.

Now with reference to FIG. 4, the diagram illustrates the functional aspects involved in the interaction between the end user and each web page invoked, per the improvement according to the present invention. In this illustration, the virtual system appears as a sole unit representing thereby devices to be run both in the client machine and in the server machine 410. It includes the page manager 411, which is in charge of coordinating the whole interactive process 450 and 460 between the end user 400 and any page invoked thereby. The said page manager includes a mechanism which integrates in each web page: the visual objects specified in SGML language (HTML, XML, VML, MathML, etc.) 414, the respective server and client processing 415 and the instances of components used in the respective functional context 422, 423 and 424 as configured in sub-areas of association, named sections, 416, 417 and 418.

For the visual objects 414, the manager 411 provides methods allowing that:

one single page may have various layout styles, which may be preconfigured using the page configuration kit or in runtime;

the statistical data of the page may be filtered through a translation filter 412 according to the display language detected at the end user's browser utility; and the variable information requiring programming manipulation may be configured externally to avoid having one sole programming source code mixed with the layout.

The page sections 416, 417 and 418 are areas indicated in the respective layout 414 that constitute instances of reusable components 422, 423 and 424 representing linked objects which implementation is performed by external classes 419, 420, 421. These classes 419, 420, and 421 provide resources for the configuration of the visual aspect of the respective instances by the values of their properties, and generate methods and events that may be manipulated by the page programming resource 415.

In addition, the manager 411 provides methods for the programming resource 415 that allow full manipulation of the variable information of the page, automatically framing their generated contents within the context of the layout resource 414; and allowing onscreen updating of only the data that underwent alterations, after sending the page to the browser, thus avoiding the blinking impression and reducing the size of the network packets exchanged between the client machine and the server.

Lastly, the diagram shown in FIG. 4 of the present invention lists the repertory 413 of messages used by the page programming resource 415 to display error messages, processing warnings, etc. to the end user. The page manager 411 also provides a runtime translation functionality by the translation filter 412.

In summary, with the improvement provided by the present invention, one single page containing one single programming source code in the server and in the client may hereby independently include:

several configurable layout formats and styles;

static contents and processing messages that are automatically translated; and sections with linked reusable component instances, which layouts may also have various styles and configurable formats.

Figure 5:
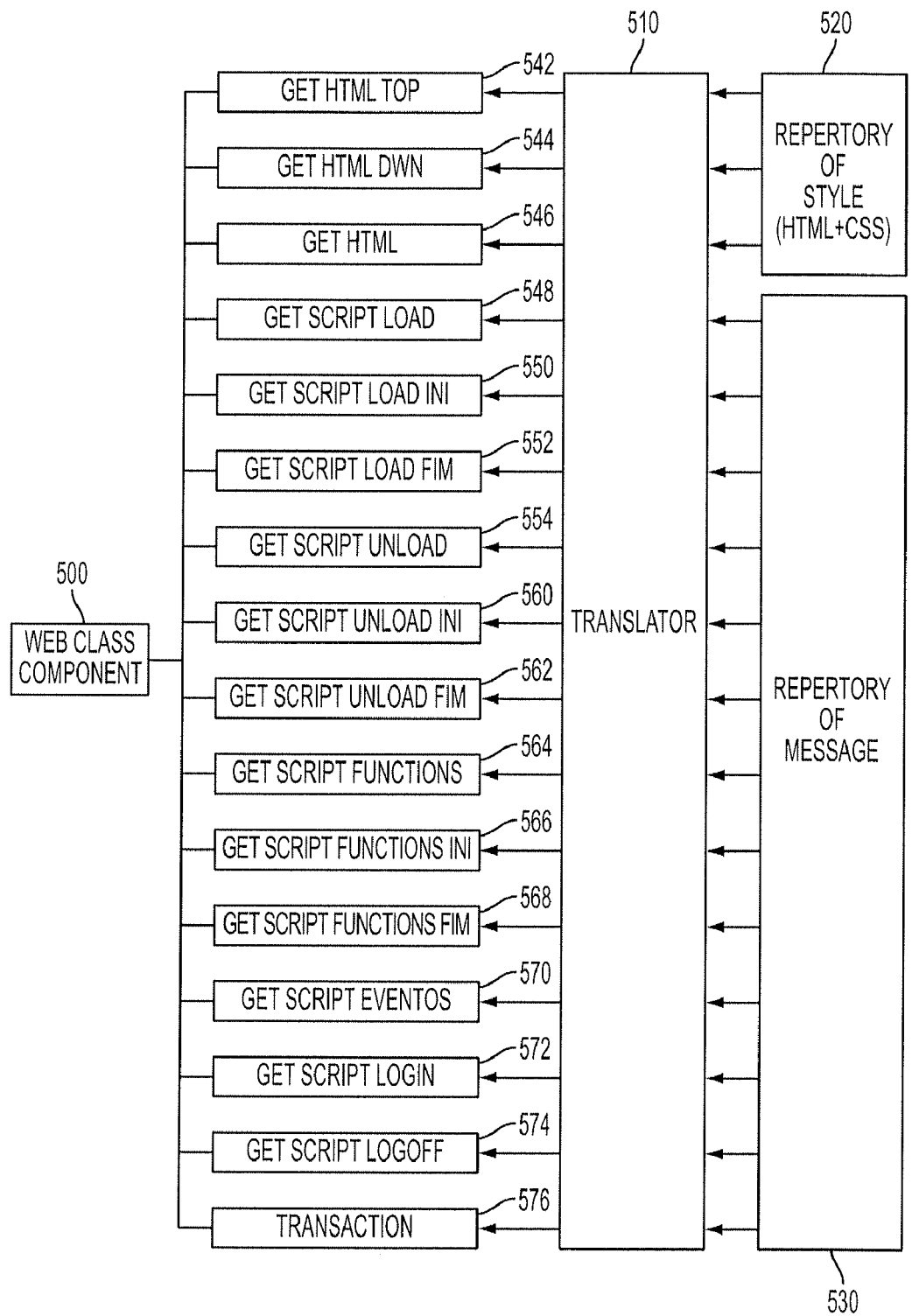
FIG. 5 is a block diagram showing a detailed representation of the methods implemented by the Web components according to the present invention.

Now describing the present invention in greater detail regarding the functional scheme of the classes that implement the reusable components that are linked to the pages, FIG. 5 illustrates methods that are inherited and overwritten according to the programming established by the developer, which form all the interfacing required between the created components and the virtual system. By implementing this whole set of methods or a part thereof, the developer will be able to both create components to simply act as usability enhancers such as menus, toolbars, grids, buttons, etc., and components having a complex programming on the server side, totally independent from the pages linked therewith, such as, for example, polls, registration forms, etc. Each component having been created is available for use, both linked to web pages and to other components, which opens an infinite number of possibilities for development where everything that is created is immediately available for use at different levels.

In the diagram of FIG. 5 there is shown a repertory of visual objects associated to component 520, which characteristics are analogous to those of the repertory 414 of visual objects of pages, as previously described in detail and illustrated in FIG. 4. According to this context, the main component class 500 illustrated in FIG. 5 provides, to the classes inheriting the same, secure methods allowing that:

one same component may have plural layout styles, which may be preconfigured using the page configuration kit or in runtime;

the static information present in the SGML language applied to the component may be filtered through a translation filter 510 according to the display language detected at the browser utility of the end user; and the variable information that needs to be manipulated by programming may be configured externally in order to avoid having one sole programming source code mixed with the layout.

The same reasoning of analogy applies to the repertory of messages of components 530, illustrated in FIG. 5, in relation to the repertory of messages of pages 413 as previously described in detail and illustrated in FIG. 4. In this case, the main class of components, by the translation filter 510, provides secure methods for translation of error messages, processing warnings, etc., that are sent to the end user within the scope of use of the implemented component.

Having thus provided a detailed functional description in regard of the repertories of visual objects 520 and of messages 530 and translation resource 510 included in the diagram of FIG. 5, there will be provided below the details of each of the methods disclosed herein:

the method get_html( ) 546 is used to send the SGML language codes for each instance of the component to be displayed by the browser, framing the variable information within the scope of the layout thereof according to the convenience of the developer;

the methods get_html_top( ) 542 and get_html_dwn( ) 544 have functionalities that are identical to the case of the method get_html( ) 546, however they are used for components that act as containers for other components, such as frames, button bars, etc., thus allowing the provision of a visual wrapping;

the method get_script load( ) 548 is used for sending the script code to be run for each instance of the component when the same is loaded into the browser, both in the page loading (event window.onload) and when its content is dynamically updated;

since a page may contain the same component with instances spread out through various sections, the methods get_script_load_ini( ) 550 and get_script_load_fim( ) 552 are used for sending the loading script codes to be run before and after the loading scripts generated by the method get_script_load( ) 548 of the respective instances, allowing initializations at the class level;

the method get_script_unload( ) 554 is used for sending the script code to be run for each instance of the component when the same is unloaded from the browser, both when unloading the page (event window.onunload) and prior to its content being dynamically altered;

since a page may contain the same component with instances spread out through various sections, the methods get_script_unload_ini( ) 560 and get_script_unload Jim( ) 562 are used for sending the unload script codes to be run before and after the unload scripts generated by the method get_script_unload( ) 554 of the respective instances, allowing terminations at the class level;

the method get_script_functions( ) 564 is used for sending the script code representing functions and properties at the page level for each instance of the component, in order to act as support to programming manipulations;

the methods get_script_functions_ini( ) 566 and get_script_functions_fim( ) are used for sending the script code representing functions and properties at the page level, in order to act as support to shared programming manipulations in all instances, where the first method is sent prior to sending the method get_script_functions( ) 564 of the instances and the other method is sent subsequently;

the method get_script_eventos( ) 564 is used for sending the script code to be run for each instance of the component for manipulation of events;

the method get_script_login( ) 572 is used for sending the script code to be run for each instance of the component at the time of user login;

the method get_script_logoff( ) 574 is used for sending the script code to be run for each instance of the component when the user logs off; and the method transaction( ) 576 is used for transactions between the client programming and the server programming of each instance of the component that do not necessarily entail visual content changes.

Figure 6:
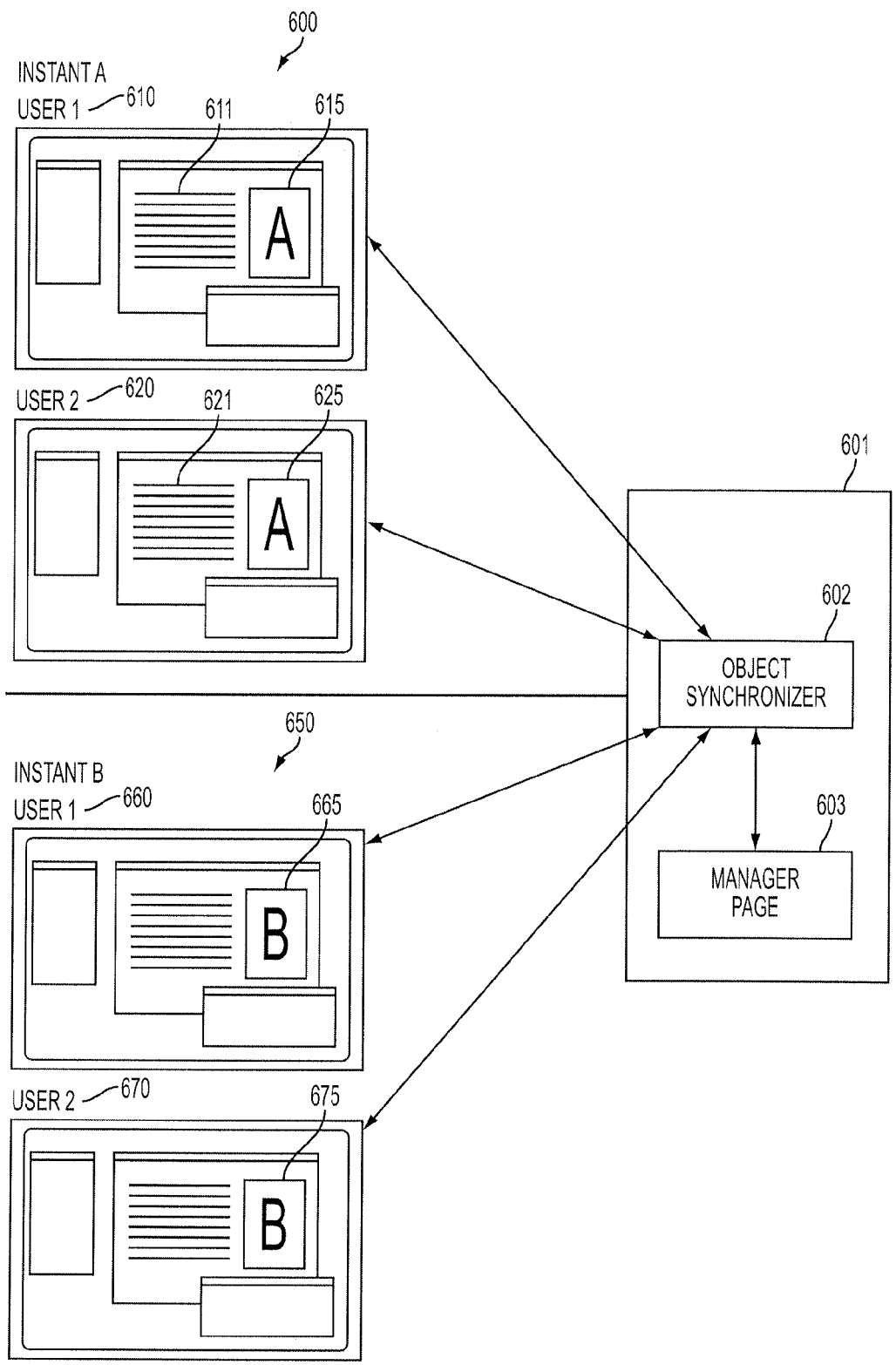
FIG. 6 is a block diagram illustrating the object synchronization mechanism according to the present invention.
Figure 7:
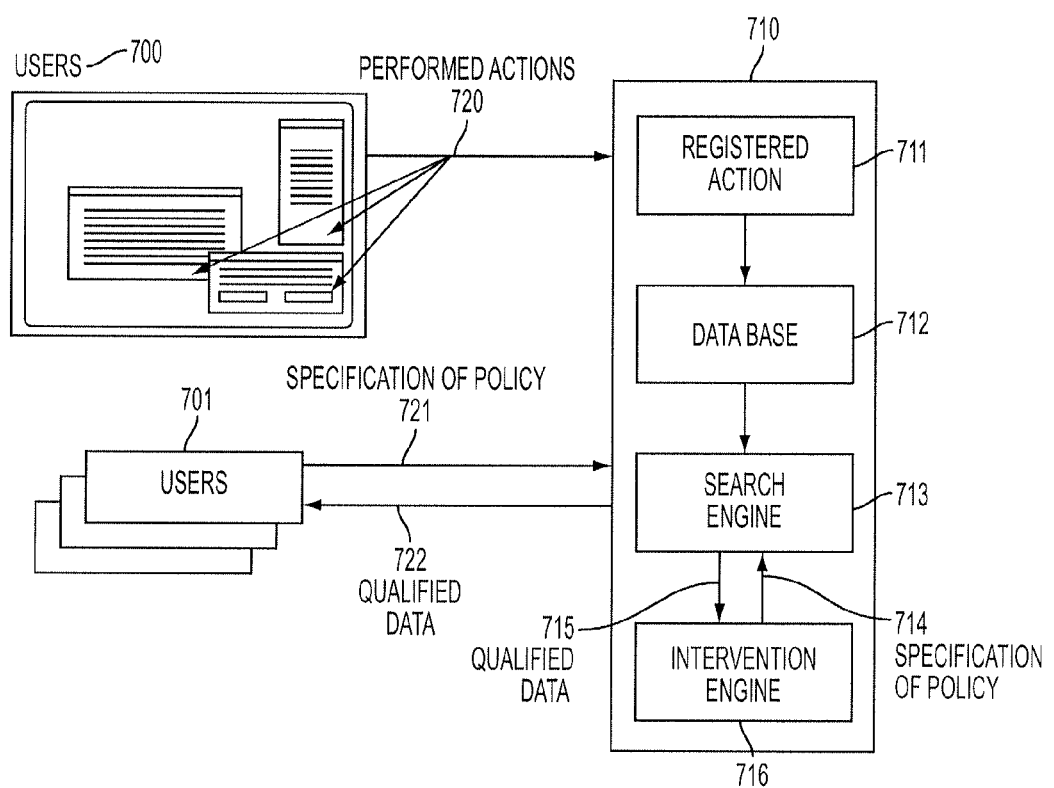
FIG. 7 is a block diagram illustrating the mechanism used to monitor already performed actions according to the present invention.
Figure 8:
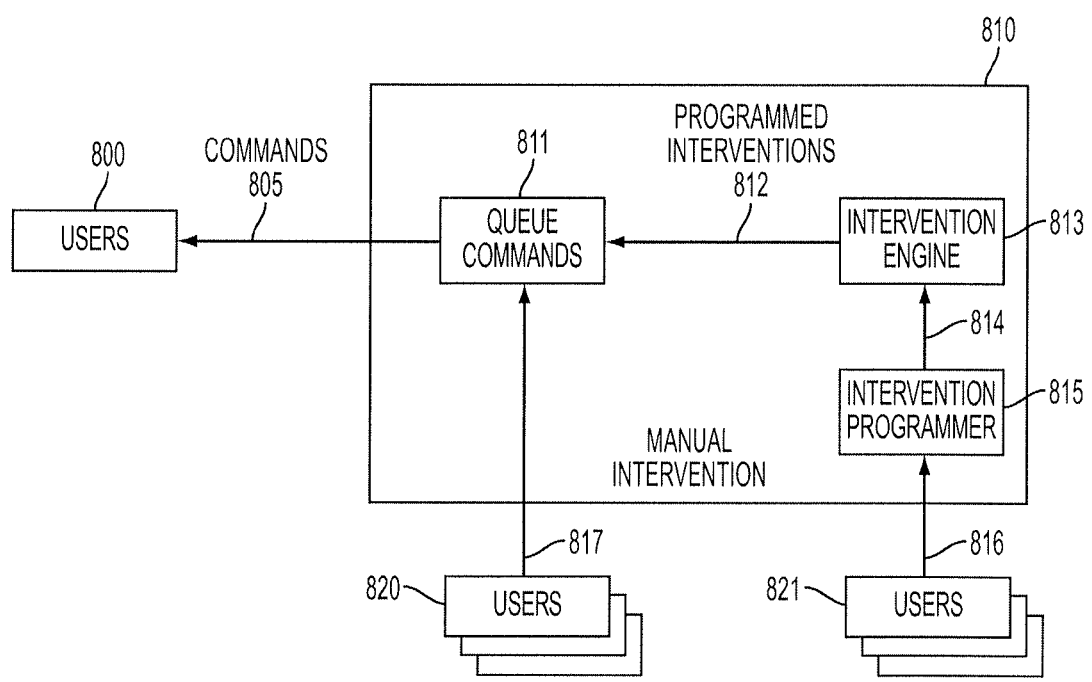
FIG. 8 is a block diagram illustrating the real time intervention mechanism according to the present invention.

In this object-oriented model as proposed by the present invention, in addition to the above cited range of resources, the virtual system further provides the following capabilities that may be used both at the page level and at the component level: the ability to dynamically update contents in a synchronous manner as illustrated in FIG. 6, the ability to monitor all user actions as illustrated in FIG. 7, and the ability to generate interventions in real time as illustrated in FIG. 8.

With reference to FIG. 6, the diagram shows the virtual system in the form of a single unit wherein are represented devices to be run both in the client machine and in the server machine 602. It includes the object synchronizer 602, which is in charge of examining the content programming scheduled by time of each page, and of invoking the manager 603 in order that, at predetermined times, the content be subject to visual changes in a synchronous manner. Hence each page or page section may have a programming that is independent from content updating, that is preconfigured, and which visual alteration is perceived at the same time by all users having accessed the page in question. This is exemplified in FIG. 6, where the diagram shows the screens of two distinct users operating the virtual system 610 and 620, viewing the same page 611 and 621 at a certain moment 600. A certain part of the page in question 615 and 625 was preconfigured such that its content is altered at a certain time. At the scheduled time 650, therefore, the object synchronizer 602 updates the content having been established 665 and 675 for all users 660 and 670 simultaneously.

Each page may have any section of its layout scheduled for dynamic updating of synchronized content, and each content per se may consist in any SGML language code and may in addition include running scripts interpreted by the browser program.

The synchronization of page sections may also be configured to be associated to stream-type object timing (MPEG, AVI, MP3, WAV, etc.) allowing, for example, dynamic updating of contents according to the scenes of a certain movie.

Now describing in further detail the topic related to monitoring of already performed actions, the diagram of FIG. 7 depicts a mechanism whereby the virtual system is shown as a single unit, wherein are represented devices for running both in the client machine and in the server machine 710. This mechanism shows the screen of a user while using any application within the context of the virtual system 700. Within the scope of use of the application, the user performs actions of types such as clicking on buttons, filling in fields, etc. 720, which actions are then recorded by the registration module 711, in the database 712 of the virtual system. The information relative to actions is then available for immediate access by a virtual system search engine 713, which purpose consists in providing the information from the database 715 and 722 requested by different agents 716 and 701 by specification of policies 714 and 721. In the case illustrated herein, the agents involved are: other users 701, which when so authorized, may additionally be monitoring the actions 720 of the target user 700 in real time; and the very intervention engine, which purpose will be explained below in relation to the detailed description of FIG. 8.

The actions that should or should not be recorded are dependent on the convenience of the developer of the application, who may avail him or herself of methods provided by the virtual system and oriented to this purpose, using the same within the scope of component or page source programming.

Referring to the interventions in real time, the diagram of FIG. 8 describes a mechanism wherein the virtual system is shown as a single unit representing devices intended to be run both in the client machine and in the server machine 810. This mechanism is in charge of sending commands 805, defined as complete sequences of script codes, to be run, according to certain circumstances, by the browser utilities of the users that are accessing the virtual system 800. The command queue device 811 depicted in the diagram of FIG. 8 then performs, for each user, the following tasks: receiving the interventions 817 and 812 directed thereto, organizing those interventions in a queue considering priorities, waiting times, schedules, etc. and causing the respective browser program 600 to run the associated commands without the user having entered any request for such purpose.

The interventions directed at each user may be generated manually 817 or automatically 812. The manual interventions 817 represent real time commands originating from other users 820 that are, together with the target user 800, logged in the virtual system. The generation of such interventions is defined and specified within the scope of the source programming of the applications using methods provided by the virtual system for this purpose. As a basic example of this functionality there may be cited the contacts management device available in the virtual system. Therein, each user may view the list of his or her favorite contacts and check which of these are online at the time. The user is then able to select one or more contacts that are online and may send, for example, an instant message or an invitation to meet in a chat room. In both cases, the application uses the intervention device of the virtual system in order to display on the respective screens of the contacts selected by the user a window containing either the instant message or the invitation to meet in a chat room, depending on the case.

The virtual system also includes a device allowing automatic generation of interventions in real time based on previously established conditions. Therefore, using this resource the users that are operating as system administrators, developers, or any user having authorization for such purpose 821, will be able to define generic running conditions for the desired interventions 816, specifying the same by the intervention programming resource of the virtual system 815. In order to specify such conditions, there may be adequately combined database selection filters, time scheduling, and processes related to a given workflow. The intervention engine of the virtual system 812 interprets adequately the established programming 814 and generates the intervention commands associated thereto 812 for the command queue device 811 that will ensure that the same are conveniently run in the machine of each target user.

This functionality allows, for example, a user acting as the administrator of a given application to establish that, upon running some process, certain users will receive a notice and will have to fill in information present on the page form that will be automatically opened by the intervention mechanism, in order to proceed with a certain work routine. Alternatively it also allows the administrator of a content portal built under the context of the virtual system to determine, for example, that upon a certain number of clicks on a selected poll, a window containing an advertisement of a certain sponsor will be sent to all users having answered the poll in question with the selection of a given option.

Figure 9:
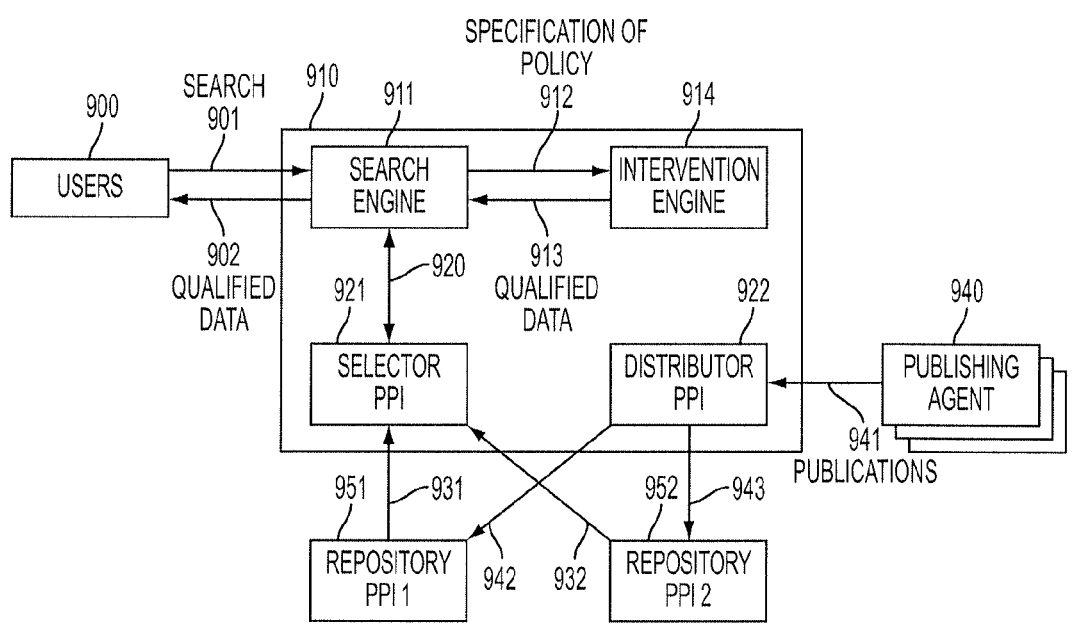
FIG. 9 is a block diagram illustrating the advertising and search mechanism according to an embodiment of the present invention.

Now referring to publications in general, the virtual system that is the object of the present invention allows instant display of any publication (articles, advertising campaigns, news, press releases, etc.) in all user networks where the same is installed This functionality is illustrated in the diagram of FIG. 9 wherein is shown the virtual system in the form of a single unit, including devices intended to run both in the client machine and the server machine 910. Using the publication manager provided by the system, the users that are publishing agents 940 send their respective publications 941 to a distributor device 922 which upon setting them up adequately by category and field of interest and market segment, selects the repertory of publications as listed for storage 951 and 952 among those available. When a user 900 conducts, for example a search involving publishable objects, the virtual system search engine 911 accesses a selector 921 to locate in the external publication repertories 951 and 952, simultaneously, the publications that meet the established search criteria 901. The user 900 then receives the result of his or her search 902 as if the information were stored in the database of his or her own network. This functionality is also available to be used by the intervention engine of the virtual system 914, which accesses the search engine 911, and whereby the latter sends in a transparent manner the qualified data 913 based on the policies inputted 912.

In order to be able to play the role expected therefrom, the publication repositories 951 and 952 implement a Web Service that receives the publications to be stored 942 and 943 and sends the same to the requestor servers 931 and 932 according to the search criteria having been provided.

That which is claimed:

1. A system having a processor adapted to administer user and software application interactions in a web environment, in a computer environment involving at least one user using a browser program in a client engine communicating with a web server via the internet, wherein establishment of a computer processing layer on a client side as well as on a server side in which web pages belonging to software applications are built from their provided APIs (Application programming interfaces); wherein the system is comprising said processing layer, comprised of:

the processor for configuring an entry web page to authenticate users with registration shared by all other web pages requested from that page, the entry web page configured to dynamically load script programming codes in a language interpreted by browsers pursuant to a syntax supported by a detected browser and which comprises a set of APIs at the client side to be called by the other web pages requested from that page inasmuch as that set of APIs resides in a single shared area, reducing memory use in a client engine besides being capable of being configured so that a name of each property or function belonging to it is better tailored to languages and customs of countries, the entry web page configured to implement calls for the other web pages requested from that page via a configurable menu area so that developers can dock the call for any web page at any hierarchical level and with visual content automatically altered when the user is authenticated by adding or removing from options calls for web pages that, according to configuration, require specific permissions to start, the entry web page configured to load in the browser of a client engine the requested web pages from that page so that they appear in windows with visual concurrency, the entry web page configured to create the appearance of a single document interface (SDI) environment or appearance of a multiple document interface (MDI) environment according to the configuration in a course of a display of windows of the requested web pages from that page, the entry web page configured to load requested web pages from that page so that they can also appear as a desktop background when an MDI environment is configured; a page manager class configured to provide properties and functions (API) inherited by the other web pages belonging to applications so as to coordinate the interaction process with the user integrating layout elements consisting of HTML codes to position a patch or section of successor web pages, static content consisting of fixed messages and texts belonging to the successor web pages, and programming objects encompassing codes executed in the server side to produce dynamic content in the successor web pages and script codes executed by the browser in the client side, the page manager class configured to automate integration of the dynamic content produced in the processing of each successor web page in the server within its layout context which is specified completely separately via HTML codes, the page manager class configured to update in a browser screen only that information that was altered in a course of processing in the server side of each successor web page from its previous to its current status, the page manager class configured to automate functionality of its successor web pages having multiple layouts that can be configured as to design time as well as to execution time, the page manager class configured to automate functionality of its successor web pages having their static visual contents translated to a language detected in the browser of each user, the page manager class configured to integrate instances of reusable components in the context of the layout of its successor web pages appropriately calling functions implemented by successor component classes of a component manager class such that the same successor web page can have various instances of a same component spread through its sections;

a web pages and applications setup kit comprising page manager class successor web pages and configured to provide capabilities for the developer to build and configure page manager class successor web pages establishing an entire link between its design objects, its docked components, and its programming in the server and the browser, as well as permissions and behaviors;

the component manager class being configured to enable, by inheritance and implementation of its properties and functions (API), creation of reusable components defined as patches of HTML codes associated with compiled server programming codes and client programming codes in interpreted scripts thus comprising a single functional unit capable of docking to context of the page manager class successor web pages and with customization of its visual aspect and its process behavior being carried out by exposure of its properties, functions, and events, the component manager class configured to integrate dynamic content produced in the processing of each successor component class in the server side within the context of its layout which is specified completely separately via HTML codes, the component manager class configured to automate functionality of its successor component classes having multiple layouts and formats that can be configured as to a design time as well as to an execution time, the component manager class configured to automate the functionality of its successor component classes having their static visual contents translated to a language detected in the browser of each user, the component manager class configured to enable a creation of reusable components from other preexistent reusable components integrating their visual and behavioral aspects in a single functional framework and in a manner that the same instance of successor component class can have various instances of another successor component class in different patches or sections, the component manager class configured to provide a function to be implemented by its successor component classes that is used to send the HTML codes of each instance of the component to be designed by the browser, sorting the variable information within the scope of its layout as convenient to the developer, the component manager class configured to provide a function to be implemented by its successor component classes that is used to send the HTML codes of each instance of the component to be designed by the browser, sorting the variable information within the scope of its layout as convenient to the developer, and so that the component serves as a container to other components, visually involving them, the component manager class configured to provide a function to be implemented by its successor component classes that is used to send the script code to be executed for each instance of the component when the latter is loaded in the browser during page load (window.onload event) as well as when its content is dynamically changed, the component manager class configured to provide a function to be implemented by its successor component classes that is used to send the script code to be executed before the script codes of their instances are executed when the latter are loaded in the browser during page load (window.onload event), the component manager class configured to provide a function to be implemented by its successor component classes that is executed after the script codes of their instances are executed when the latter are loaded in the browser during page load (window.onload event), the component manager class configured to provide a function to be implemented by its successor component classes that is used to send the script code to be executed for each instance of the component when the latter is unloaded from the browser during page unload (window.onunload event) as well as immediately before its content is dynamically changed, the component manager class configured to provide a function to be implemented by its successor component classes that is used to send the script code to be executed before the script codes of their instances are executed when latter are unloaded from the browser during page unload (window.onunload event), the component manager class configured to provide a function to be implemented by its successor component classes that is used to send the script code to be executed after the script codes of their instances are executed when the latter are unloaded from the browser during page unload (window.onunload event), the component manager class configured to provide a function to be implemented by its successor component classes that is used to send the script code representing functions and properties at a page level for each instance of the component to serve as a support for programming manipulation, the component manager class configured to provide a function to be implemented by its successor component classes that is used to send the script code representing functions and properties at the page level to serve as a support for shared programming manipulation in all instances, the component manager class configured to provide a function to be implemented by its successor component classes that is used to send the script code to be executed for each instance of the component for event manipulation, the component manager class configured to provide a function to be implemented by its successor component classes that is used to send the script code to be executed for each instance of the component in event of user login, the component manager class configured to provide a function to be implemented by its successor component classes that is used to send the script code to be executed for each instance of the component in event of user logoff, the component manager class configured to provide a function to be implemented by its successor component classes that is used to carry out transactions between the client programming and the server programming of each instance of the component not necessarily implying in visual alterations of the content;

a component setup kit comprising page manager class successor web pages to provide functionalities for the developer to create reusable components establishing their properties, functions, events, and design styles;

a content synchronization class configured to automate the dynamic exchange of contents of each page manager class successor web page in a synchronized manner, so that all connected users observe a visual effect at the same moment, the content synchronization class configured to perform synchronization based on time-schedule specified configuration, the content synchronization class configured to automate the functionality that each patch of each page manager class successor web page may have its content programming scheduled at separate times from other patches, the content synchronization class configured to automate the functionality that each instance of reusable component docked to each page manager class successor web page may have its content programming scheduled at separate times, the content synchronization class configured to automate the functionality that each dynamically alterable content consists of any HTML code and can also include execution scripts interpreted by the browser, the content synchronization class configured to also automate the dynamic exchange of page content synchronized to a timing of stream-type objects (MPEG, AVI, MP3, WAV, etc.) enabling the dynamic change of page patches;

an action monitoring class configured to register actions executed by users within the scope of manageability of page manager class successor web pages according to the configuration, the action monitoring class configured to register actions executed by users within the scope of manageability of component manager class successor component classes belonging to page manager class successor web pages according to the configuration, the action monitoring class configured to carry out registration of actions executed through an asynchronous optimized communication between the client engine and the server, the action monitoring class configured to make available information relative to actions registered in a system database for real time access;

an intervention manager class configured to automate a remote sending of commands to be executed by the browser of delegate users without their having made such a request, the intervention manager class configured to administer a behavior of intervention commands being defined as a complete sequence of script codes in interpreted language associated with additional properties configuring if the command is of mandatory or optional execution, if the command is of immediate or scheduled execution, the command's execution priority level, in case of commands with scheduled execution, an time of execution, in case of commands with optional execution, an explanatory message to be displayed to the user so that he/she can make a decision, in case of commands with optional execution, a maximum wait time for decision making, in case of commands with optional execution, a text link to activate execution in case of a positive decision, in case of commands with optional execution, a text link representing a non execution in case of a negative decision, in case of commands with optional execution, if an agent originating the command should be warned or not in case of a positive decision, in case of commands with optional execution, if the agent originating the command should be warned or not in case of a negative decision, in case of commands with optional execution, if the agent originating the command should be warned or not in case of wait time runout, and in case of commands with optional execution generating warnings to their respective originator agents, if, in case of a negative decision, the user should inform a reason for that or not, the intervention manager class configured to perform, for each connected user, tasks of receiving intervention commands directed to it, organizing them in a queue considering their priorities, wait and scheduled times, carrying out a separation between commands of mandatory and commands of optional execution, ensuring that the browser executes a next command of available execution and notifying it about commands of optional execution that have still not been expedited, making them available for immediate and later access, the intervention manager class configured to provide methods that allow the page manager class successor web pages as well as the component manager class successor component classes to create and to access intervention commands, the intervention manager class configured to send commands relative to any page manager class successor web pages, the intervention manager class configured to send commands relative to any component manager class successor component classes, the intervention manager class configured to also produce automatic generation of intervention commands according to previously specified conditions combining database search directives with process sequences that are within the framework of the workflow of the applications involved;

an external publication repository interface class configured to automate the functionality of storing each publication configuration in a single location and making it available for shared access throughout a user network connected to any server facility, the external publication repository interface class configured to establish connection to external publication repositories by implementation of a web service providing a function that receives and stores in a database all data relative to publications sent and a function that receives research specifications and returns data relative to the publications selected, the external publication repository interface class configured to distribute each desired publication, after properly categorizing it, sorting it into fields of interests and market segments, to its corresponding publication repository, the external publication repository interface class set to perform a simultaneous browse of the external publication repositories and to unify the data received when receiving a search specification, the external publication repository interface class configured to provide a function to be implemented by the page manager class successor web pages as well as the component manager class successor component classes used to receive publication search requests, the external publication repository interface class configured to receive search requests from the intervention manager class;

a metadata manager class configured to provide the page manager class successor web pages as well as the component manager class successor component classes with capabilities to send and receive data in XML format within a framework of client engine and server transactions;

a process manager class configured to provide the page manager class successor web pages as well as the component manager class successor component classes with capabilities to trigger and manage batch processing programs running in independent lines of execution;

a contact manager application comprising page manager class successor web pages and configured to provide capabilities for the user to register contacts in interest groups and trigger instant messaging, chat invitation, and discussion list services, and sending emails;

a chatroom manager application comprising page manager class successor web pages and configured to provide capabilities for the user to manage chats and discussion list already carried out, in progress, or to be carried out, with scheduling, search, and tracking options;

an email manager application comprising page manager class successor web pages and configured to provide capabilities for the user to send, receive, and manage emails, organize in folders, manage address book, perform searches and tracking;

a file manager application comprising page manager class successor web pages and configured to provide capabilities for the user to store and organize files and folders in a virtual area and to manage favorites;

a publication manager application comprising page manager class successor web pages and configured to provide capabilities for the user to publish and manage news, polls, opportunities, articles, blogs, and ad campaigns;

a search manager application comprising page manager class successor web pages and configured to provide capabilities for the user to generate reports and graphs with filter options of selection, ordering, totaling, decision cubes, for the entire database not only of the virtual system itself, but of any application configured to run within its context;

a user and organization manager application comprising page manager class successor web pages and configured to provide capabilities for an administrator to configure virtual system users with registration of their respective organizations, with an option of sorting them into fields of interests, quota control, and operating permission control and of using fields from the database of the virtual system itself and of any application within its context;

an information flow manager application comprising page manager class successor web pages and configured to provide capabilities for the user to time-schedule dynamic contents from synchronized components and pages, and to program and schedule interventions based on filters and conditions requested from the database;

a resource manager application comprising page manager class successor web pages and configured to provide capabilities for the user to monitor and configure use of the system's computing resources;

a metadata setup kit comprising page manager class successor web pages and configured to provide capabilities for the developer to configure database schemas of the applications with the inclusion of additional properties rendering them automatically available for general use of a search manager application and for configuration of user permissions;

a process setup kit comprising page manager class successor web pages and configured to provide capabilities for the user to define a behavior of batch running processes of applications and to establish intervention mechanisms in real time based on work flow.

2. A system according to claim 1, wherein said entry web page comprises:

a login section configured to authenticate users with registers shared by all other web pages requested from that page;

a script programming code dynamic load section in a language interpreted by browsers pursuant to a syntax supported by the detected browser and which comprises the set of APIs at the client side to be called by the other web pages requested from that page inasmuch as that set of APIs resides in a single shared area, reducing memory use in the client engine besides being capable of being configured so that the name of each property or function belonging to it is better tailored to the languages and customs of the countries;

a menu section configured to implement the calls for the other web pages requested, configurable so that developers can dock the call for any web page at any hierarchical level and with the visual content automatically altered when the user is authenticated by adding or removing from the options call for web pages that, according to configuration, require specific permissions to start;

a window manager class configured to load in the browser of the client engine the requested web pages so that they appear in windows with visual concurrency and can be configured to create the appearance of an SDI environment or the appearance of an MDI environment in the course of the display of windows, such that, in case of configuration to create the appearance of an MDI environment, the requested web pages can also appear as a desktop background.

3. The system according to claim 1, wherein the system is configured to administer a web page composition, wherein:

the page manager class being configured to provide properties and functions (API) inherited by the other web pages belonging to the applications so as to coordinate the interaction process with the user integrating the layout elements consisting of the HTML codes to position each patch or section of successor web pages, static content consisting of fixed messages and texts belonging to the successor web pages, and programming objects encompassing the codes executed in the server side to produce the dynamic content in the successor web pages and the script codes executed by the browser in the client side, the page manager class configured to automate integration of the dynamic content produced in the processing of each successor web page in the server within its layout context within its layout context which is specified completely separately via HTML codes, the page manager class configured to update in the browser screen only that information that was altered in the course of processing in the server side of each successor web page from its previous to its current status, the page manager class configured to automate the functionality of its successor web pages having multiple layouts that can be configured as to the design time as well as to the execution time, the page manager class configured to automate the functionality of its successor web pages having their static visual contents translated to the language detected in the browser of each user, the page manager class configured to integrate instances of reusable components in the context of the layout of its successor web pages appropriately calling the functions implemented by the successor component classes of the component manager class such that the same successor web page can have various instances of the same component spread through its sections; the web pages and applications setup kit comprising page manager class successor web pages and configured to provide functionalities for the developer to build and configure page manager class successor web pages establishing the entire link between its design objects, its docked components, and its programming in the server and the browser, as well as permissions and behaviors;

the component manager class being configured to enable by means of the inheritance and implementation of its properties and functions (API) the creation of reusable components defined as patches of HTML codes associated with compiled server programming codes and client programming codes in interpreted scripts thus comprising a single functional unit capable of docking to the context of the page manager class successor web pages and with customization of its visual aspect and its process behavior being carried out by the exposure of its properties, functions, and events, the component manager class configured to integrate the dynamic content produced in the processing of each successor component class in the server side within the context of its layout which is specified completely separately via HTML codes, the component manager class configured to automate the functionality of its successor component classes having multiple layouts and formats that can be configured as to the design time as well as to the execution time, the component manager class configured to automate the functionality of its successor component classes having their static visual contents translated to the language detected in the browser of each user, the component manager class configured to enable the creation of reusable components from other preexistent reusable components integrating their visual and behavioral aspects in a single functional framework and in a manner that the same instance of successor component class can have various instances of another successor component class in different patches or sections, the component manager class configured to provide a function to be implemented by its successor component classes that is used to send the HTML codes of each instance of the component to be designed by the browser, sorting the variable information within the scope of its layout as convenient to the developer, the component manager class configured to provide a function to be implemented by its successor component classes that is used to send the HTML codes of each instance of the component to be designed by the browser, sorting the variable information within the scope of its layout as convenient to the developer, and so that the component serves as a container to other components, visually involving them, the component manager class configured to provide a capability to be implemented by its successor component classes that is used to send the script code to be executed for each instance of the component when the latter is loaded in the browser during page load (window.onload event) as well as when its content is dynamically changed, the component manager class configured to provide a capability to be implemented by its successor component classes that is used to send the script code to be executed before the script codes of their instances are executed when the latter are loaded in the browser during page load (window.onload event), the component manager class configured to provide a capability to be implemented by its successor component classes that is used to send the script code to be executed after the script codes of their instances are executed when the latter are loaded in the browser during page load (window.onload event), the component manager class configured to provide a capability to be implemented by its successor component classes that is used to send the script code to be executed for each instance of the component when the latter is unloaded from the browser during page unload (window.onunload event) as well as immediately before its content is dynamically changed, the component manager class configured to provide a capability to be implemented by its successor component classes that is used to send the script code to be executed before the script codes of their instances are executed when the latter are unloaded from the browser during page unload (window.onunload event), the component manager class configured to provide a capability to be implemented by its successor component classes that is used to send the script code to be executed after the script codes of their instances are executed when the latter are unloaded from the browser during page unload (window.onunload event), the component manager class configured to provide a capability to be implemented by its successor component classes that is used to send the script code representing functions and properties at the page level for each instance of the component to serve as a support for programming manipulation, the component manager class configured to provide a capability to be implemented by its successor component classes that is used to send the script code representing functions and properties at the page level to serve as a support for shared programming manipulation in all instances, the component manager class configured to provide a capability to be implemented by its successor component classes that is used to send the script code to be executed for each instance of the component for event manipulation, the component manager class configured to provide a capability to be implemented by its successor component classes that is used to send the script code to be executed for each instance of the component in the event of user login, the component manager class configured to provide a capability to be implemented by its successor component classes that is used to send the script code to be executed for each instance of the component in the event of user logoff, the component manager class configured to provide a capability to be implemented by its successor component classes that is used to carry out transactions between the client programming and the server programming of each instance of the component not necessarily implying in visual alterations of the content;

the component setup kit comprising page manager class successor web pages configured to provide capabilities for the developer to create reusable components establishing their properties, functions, events, and design styles.

4. The system according to claim 3 wherein the page manager class is configured to provide properties and functions (API) inherited by the other web pages belonging to the applications so as to coordinate the interaction process with the user and to integrate the layout elements consisting of the HTML codes to position each patch or section of successor web pages; static content, consisting of fixed messages and texts belonging to successor web pages; and programming objects, encompassing the codes executed in the server side to produce the dynamic content in the successor web pages and the script codes executed by the browser in the client side.

5. The system according to claim 4 wherein the page manager class is configured to automate integration of the dynamic content produced in the processing of each successor web page in the server within its layout context which is specified completely separately via HTML codes.

6. The system according to claim 5 wherein the page manager class is configured to update in the browser screen only that information that was altered in the course of processing in the server side of each successor web page from its previous to its current status.

7. The system according to claim 6 wherein the page manager class is configured to automate the functionality of its successor web pages having multiple layouts that can be configured as to the design time as well as to the execution time.

8. The system according to claim 7 wherein the page manager class is configured to automate the functionality of its successor web pages having their static visual contents translated to the language detected in the browser of each user.

9. The system according to claim 8 wherein the page manager class is configured to integrate instances of reusable components in the context of the layout of its successor web pages appropriately calling the functions implemented by the successor component classes of the component manager class such that the same successor web page can have various instances of the same component spread through its sections.

10. The system according to claim 3 wherein the component manager class is configured to enable by means of the inheritance and implementation of its properties and functions (API) the creation of reusable components defined as patches of HTML codes associated with compiled server programming codes and client programming codes in interpreted scripts thus comprising a single functional unit capable of docking to the context of the page manager class successor web pages and with the customization of its visual aspect and its process behavior being carried out by the exposure of its properties, functions, and events.

11. The system according to claim 10 wherein the component manager class is configured to integrate the dynamic content produced in the processing of each successor component class in the server side within the context of its layout which is specified completely separately via HTML codes.

12. The system according to claim 11 wherein the component manager class is configured to automate the functionality of its successor component classes having multiple layouts and formats that can be configured as to the design time as well as to the execution time.

13. The system according to claim 12 wherein the component manager class is configured to automate the functionality of its successor component classes having their static visual contents translated to the language detected in the browser of each user.

14. The system according to claim 13 wherein the component manager class is configured to enable the creation of reusable components from other preexistent reusable components integrating their visual and behavioral aspects in a single functional framework and in a manner that the same instance of successor component class can have various instances of another successor component class in different patches or sections.

15. The system according to claim 14 wherein the component manager class is configured to provide a set of APIs to be implemented by its successor component classes, the component manager class being configured to send the HTML codes of each instance of the component to be designed by the browser, sorting variable information within the scope of its layout as convenient to the developer;

the component manager class being configured to send the HTML codes of each instance of the component to be designed by the browser, sorting the variable information within the scope of its layout as convenient to the developer, and so that the component serves as a container to other components, visually involving them;

the component manager class being configured to send the script code to be executed for each instance of the component when the latter is loaded in the browser during page load (window.onload event) as well as when its content is dynamically changed;

the component manager class being configured to send the script code to be executed before the script codes of their instances are executed when the latter are loaded in the browser during page load (window.onload event);

the component manager class being configured to send the script code to be executed after the script codes of their instances are executed when the latter are loaded in the browser during page load (window.onload event);

the component manager class being configured to send the script code to be executed for each instance of the component when the latter is unloaded from the browser during page unload (window.onunload event) as well as immediately before its content is dynamically changed;

the component manager class being configured to send the script code to be executed before the script codes of their instances are executed when the latter are unloaded from the browser during page unload (window.onunload event);

the component manager class being configured to send the script code to be executed after the script codes of their instances are executed when the latter are unloaded from the browser during page unload (window.onunload event);

the component manager class being configured to send the script code representing functions and properties at the page level for each instance of the component to serve as a support for programming manipulation;

the component manager class being configured to send the script code representing functions and properties at the page level to serve as a support for shared programming manipulation in all instances;

the component manager class being configured to send the script code to be executed for each instance of the component for event manipulation;

the component manager class being configured to send the script code to be executed for each instance of the component in the event of user login;

the component manager class being configured to send the script code to be executed for each instance of the component in the event of user logoff;

the component manager class being configured to carry out transactions between the client programming and the server programming of each instance of the component not necessarily implying in visual alterations of the content.

16. The system according to claim 1 wherein the system is configured to synchronize the exchange of contents in time-scheduled web page elements so that all connected users observe the visual effect at the same moment, comprising:

the content synchronization class being configured to automate the dynamic exchange of contents of each page manager class successor web page in a synchronized manner, so that all connected users observe the visual effect at the same moment, the content synchronization class configured to perform the synchronization based on time-schedule specified configuration, the content synchronization class configured to automate the functionality that each patch of each page manager class successor web page may have its content programming scheduled at separate times from other patches, the content synchronization class configured to automate the capability that each instance of reusable component docked to each page manager class successor web page may have its content programming scheduled at separate times, the content synchronization class configured to automate the capability that each dynamically alterable content consists of any HTML code and can also include execution scripts interpreted by the browser, the content synchronization class configured to also automate the dynamic exchange of page content synchronized to the timing of stream-type objects (MPEG, AVI, MP3, WAY, etc.) enabling the dynamic change of page patches;

the information flow manager application comprising page manager class successor web pages and configured to provide the functionalities for the user to time-schedule dynamic contents from synchronized components and pages, and to program and schedule interventions based on filters and conditions requested from the database.

17. The system according to claim 16 wherein a content synchronization class is configured to automate the dynamic exchange of contents of each page manager class successor web page in a synchronized manner, so that all connected users observe the visual effect at the same moment, the content synchronization class being configured to perform the synchronization based on time-schedule specified configuration.

18. The system according to claim 17 wherein a content synchronization class is configured to automate the functionality that each patch of each page manager class successor web page may have its content programming scheduled at separate times from other patches.

19. The system according to claim 18 wherein a content synchronization class is configured to automate the functionality that each instance of reusable component docked to each page manager class successor web page may have its content programming scheduled at separate times.

20. The system according to claim 19 wherein a content synchronization class is configured to automate the functionality that each dynamically alterable content consists of any HTML code and can also include execution scripts interpreted by the browser.

21. The system according to claim 20 wherein a content synchronization class is configured to also automate the dynamic exchange of page content synchronized to the timing of stream-type objects (MPEG, AVI, MP3, WAY, etc.) enabling the dynamic change of page patches.

22. The system according to claim 1 wherein the action monitoring class is configured to register the actions executed by users within the scope of manageability of page manager class successor web pages according to the configuration.

23. The system according to claim 22 wherein the action monitoring class is configured to register the actions executed by users within the scope of manageability of component manager class successor component classes belonging to page manager class successor web pages according to the configuration.

24. The system according to claim 23 wherein the action monitoring class is configured to carry out the registration of actions executed through an asynchronous optimized communication between the client engine and the server.

25. The system according to claim 24 wherein the action monitoring class is configured to make available information relative to the actions registered in a system database for real time access.

26. The system according to claim 1 wherein the system is configured to manage the sending of commands to be executed by the browser of delegate users without their having made such a request, comprising:

the intervention manager class being configured to automate the remote sending of commands to be executed by the browser of delegate users without their having made such a request, the intervention manager class configured to administer the behavior of intervention commands being defined as a complete sequence of script codes in interpreted language associated with additional properties configuring if the command is of mandatory or optional execution, if the command is of immediate or scheduled execution, the command's execution priority level, in case of commands with scheduled execution, the time of execution, in case of commands with optional execution, the explanatory message to be displayed to the user so that he/she can make a decision, in case of commands with optional execution, the maximum wait time for decision making, in case of commands with optional execution, the text link to activate the execution in case of a positive decision, in case of commands with optional execution, the text link representing a nonexecution in case of a negative decision, in case of commands with optional execution, if the agent originating the command should be warned or not in case of a positive decision, in case of commands with optional execution, if the agent originating the command should be warned or not in case of a negative decision, in case of commands with optional execution, if the agent originating the command should be warned or not in case of wait time runout, and in case of commands with optional execution generating warnings to their respective originator agents, if, in case of a negative decision, the user should inform the reason for that or not, the intervention manager class set to perform, for each connected user, the tasks of receiving the intervention commands directed to it, organizing them in a queue considering their priorities, wait and scheduled times, carrying out the separation between commands of mandatory and commands of optional execution, ensuring that the browser executes the next command of available execution and notifying it about commands of optional execution that have still not been expedited, making them available for immediate and later access, the intervention manager class configured to allow the page manager class successor web pages as well as the component manager class successor component classes to create and to access intervention commands, the intervention manager class configured to send commands relative to any page manager class successor web pages, the intervention manager class configured to send commands relative to any component manager class successor component classes, the intervention manager class configured to also produce the automatic generation of intervention commands according to previously specified conditions combining database search directives with process sequences that are within the framework of the workflow of the applications involved;

the information flow manager application comprising page manager class successor web pages and configured to provide the capabilities for the user to time-schedule dynamic contents from synchronized components and pages, and to program and schedule interventions based on filters and conditions requested from the database.

27. The system according to claim 26 wherein the intervention manager class is configured to automate the remote sending of commands to be executed by the browser of delegate users without their having made such a request.

28. The system according to claim 27 wherein the intervention manager class is configured to administer the behavior of intervention commands being defined as a complete sequence of script codes in interpreted language associated with additional properties configuring if the command is of mandatory or optional execution; if the command is of immediate or scheduled execution; the command's execution priority level, in case of commands with scheduled execution; the time of execution, in case of commands with optional execution; the explanatory message to be displayed to the user so that he/she can make a decision, in case of commands with optional execution; the maximum wait time for decision making, in case of commands with optional execution; the text link to activate the execution in case of a positive decision, in case of commands with optional execution; the text link representing a nonexecution in case of a negative decision, in case of commands with optional execution; if the agent originating the command should be warned or not in case of a positive decision, in case of commands with optional execution; if the agent originating the command should be warned or not in case of a negative decision, in case of commands with optional execution; if the agent originating the command should be warned or not in case of wait time runout and in case of commands with optional execution generating warnings to their respective originator agents; if, in case of a negative decision, the user should inform the reason for that or not.

29. The system according to claim 28 wherein the intervention manager class is configured to perform, for each connected user, the tasks of receiving the intervention commands directed to it; organizing them in a queue considering their priorities, wait and scheduled times; carrying out the separation between commands of mandatory and commands of optional execution; ensuring that the browser executes the next command of available execution and notifying it about commands of optional execution that have still not been expedited, making them available for immediate and later access.

30. The system according to claim 29 wherein the intervention manager class is configured to allow the page manager class successor web pages as well as the component manager class successor component classes to create and to access intervention commands.

31. The system according to claim 30 wherein the intervention manager class is configured to send commands relative to any page manager class successor web pages.

32. The system according to claim 31 wherein the intervention manager class is configured to send commands relative to any component manager class successor component classes.

33. The system according to claim 32 wherein the intervention manager class is configured to also produce the automatic generation of intervention commands according to previously specified conditions combining database search directives with process sequences that are within the framework of the workflow of the applications involved.

* * * * *

UNITED STATES PATENT AND TRADEMARK OFFICE
CERTIFICATE OF CORRECTION

| | | |
|---|---|---|
| PATENT NO. | : 7,721,303 B2 | Page 1 of 1 |
| APPLICATION NO. | : 10/535886 | |
| DATED | : May 18, 2010 | |
| INVENTOR(S) | : Alves de Moura et al. | |

It is certified that error appears in the above-identified patent and that said Letters Patent is hereby corrected as shown below:

<u>Column 22,</u>
Line 60, "WAY" should read --WAV--.

<u>Column 23,</u>
Line 27, "WAY" should read --WAV--.

Signed and Sealed this
Sixteenth Day of August, 2011

David J. Kappos
*Director of the United States Patent and Trademark Office*